Sept. 19, 1967  A. POHLAND ETAL  3,342,824
NORMORPHINES
Filed Dec. 7, 1964
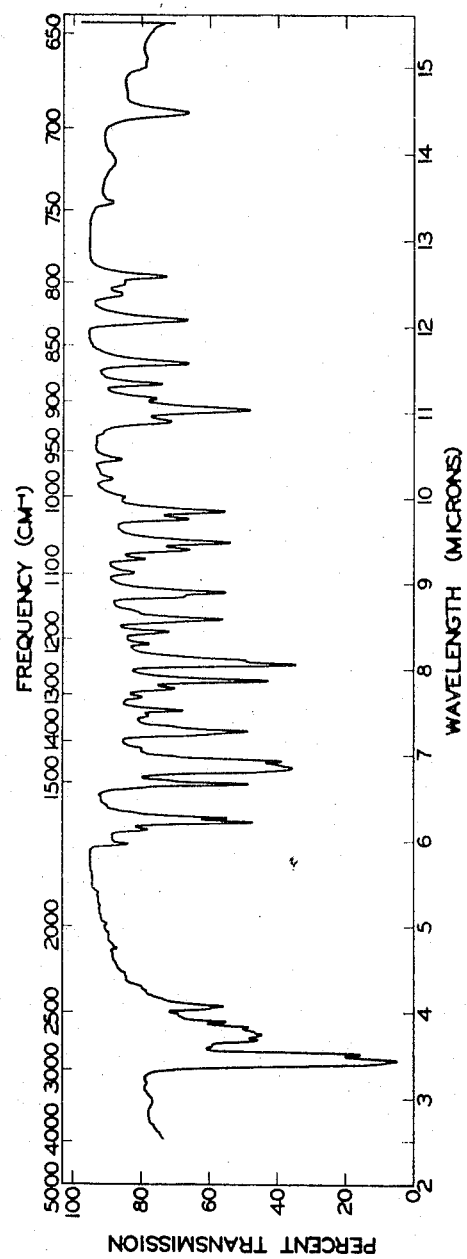
INVENTORS
ALBERT POHLAND
HUGH R. SULLIVAN, JR.
BY
ATTORNEY

3,342,824
NORMORPHINES

Albert Pohland and Hugh R. Sullivan, Jr., Indianapolis, Ind., assignors to Eli Lilly and Company, Indianapolis, Ind., a corporation of Indiana
Filed Dec. 7, 1964, Ser. No. 416,226
13 Claims. (Cl. 260—285)

This invention relates to a novel noralkaloid and the acid addition salts thereof. More particularly, the invention relates to northebaine and the acid addition salts thereof and to an improved process for demethylating thebaine and other acidlabile molecules.

Until the work herein disclosed, no simple, direct demethylation process applicable to acid-sensitive molecules was known. Therefore, one object of this invention is to provide a simple, direct method of removing a methyl group from a nitrogen atom of complex molecules which are known to be extremely acid-sensitive. Another object is to provide previously unknown compounds having interesting pharmacological activity as well as being intermediates useful for research in the important field of analgesics.

Thebaine is an alkaloid closely related to the potent analgesic codeine. The latter compound is readily demethylated by reacting it with a lower-alkyl azodicarboxylate, then hydrolyzing with dilute aqueous acid according to the method of Diels et al., Ber., 47, 2043–7 (1914). The Diels et al. procedure is a very direct and simple demethylation process; but because acid is used in the hydrolysis of the intermediate compound formed in the process, the procedure cannot be applied to acid-sensitive molecules such as thebaine. Thebaine, although structurally very much like codeine, differs significantly from codeine in being extremely sensitive to the effect of either acid or base, both of which act to destroy the thebaine molecule. Nor can those derivatives of codeine and morphine which contain acid-labile groups be demethylated by the Diels et al. method.

In one embodiment, the present invention involves first the reaction of, for example, thebaine, with a lower-alkyl azodicarboxylate in a suitable organic mutual solvent, and, second, the hydrolysis of the intermediate product with a saturated aqueous solution of ammonium chloride.

The demethylating agent employed can be illustratively the methyl, ethyl, n-propyl, n-butyl, or the like, azodicarboxylate, which can be synthesized following the method described by Rabjohn, Org. Syn., Coll., vol. III, p. 375. Aromatic hydrocarbons or saturated aliphatic hydrocarbon liquids are preferred as solvents, such as benzene, toluene, n-hexane, petroleum ether, or the like.

The desired monodemethylation is initiated by commingling the starting material, thebaine, with a lower-alkyl azodicarboxylate, in a suitable inert organic mutual solvent and allowing the resulting reaction to proceed at a moderately elevated temperature, suitably around 40–80° C. or somewhat higher, preferably around 70–80° C. Moderate application of heat is generally required to bring the reaction mixture up to optimum temperature for maximum yield, which is usually obtained by heating for about from 1 to 6 hours. The reaction period may be prolonged if desired, but without increasing or decreasing the yield.

The intermediate product obtained in this first stage of the reaction, N-(1,2-dicarbethoxyhydrazinylmethyl) thebaine, may be recovered from the reaction mixture, if desired, in a conventional manner, such as by evaporating the solvent at reduced pressure. Alternatively, the intermediate product may be allowed to remain dissolved in all or part of the organic solvent utilized in the first stage of the reaction and treated therein for the second stage.

The hydrolysis of the intermediate product, N-(1,2-dicarbethoxyhydrazinylmethyl)thebaine, is accomplished by allowing it to react with a suitable hydrolytic reagent. While the present invention, in its preferred form, employs ammonium chloride for the hydrolysis of the intermediate, it will be apparent to those skilled in the art that there are numerous derivatives of ammonia and ammonia-like substances (e.g., pyridine) which, when used in the form of an acid addition salt (e.g., pyridine hydrochloride), are capable of effecting the desired hydrolysis. It is, therefore, to be understood that the use of such substances lies within the contemplated scope of the invention.

The intermediate product, N-(1,2-dicarbethoxyhydrazinylmethyl)thebaine, is conveniently hydrolyzed by allowing it to react with, for example, a mixture of a saturated aqueous solution of ammonium chloride, ethanol, and water at a temperature ranging from about ambient room temperature to about 80–100° C. for about 1 to about 18 hours, preferably at about the reflux temperature of the mixture for about 12 hours. During the latter part of this period, a white precipitate begins to separate. This precipitate is the product, northebaine hydrochloride, which is recovered from the reaction product mixture by removing the solvent ethanol in vacuo and filtering. Yields are generally in the range of about 50–95 percent of theory based on thebaine.

The novel product obtained by the demethylation process is northebaine hydrochloride, a white crystalline solid having a melting point of about 270–272° C. (d.) after recrystallization from water. It is soluble in some of the common organic solvents, such as the lower alcohols, as well as in water. It is insoluble in other organic solvents such as chloroform, benzene, and petroleum ether.

Electrometric titration of northebaine hydrochloride in 2:1 dimethylformamide:water solution gives a pKa of 8.55. The ultraviolet absorption spectrum of a solution of northebaine hydrochloride in methanol has a maximum at 286 m$\mu$ with an absorptivity of $$E^{1\%}_{1cm.} = 7,770$$

The infrared absorption curve of northebaine hydrochloride determined as a null in mineral oil is shown in the accompanying drawing. The distinguishable bands in the infrared absorption spectra over the range of 2.0–15.0 microns are as follows: 3.44 (mineral oil), 3.51, 3.68 (complex band), 3.75 (complex band), 3.84 (complex band), 3.90 (complex band), 4.07, 5.98 (weak), 6.14 (weak), 6.23, 6.27, 6.67, 6.86 (mineral oil), 6.95, 7.08, 7.29 (mineral oil), 7.47, 7.52, 7.68, 7.78, 7.87, 8.06, 8.10 (shoulder), 8.29, 8.44, 8.58, 8.86 (shoulder), 8.90, 9.12, 9.29, 9.40, 9.49, 9.76, 9.85, 10.00, 10.22, 10.45, 10.89, 11.04, 11.16, 11.33, 11.57, 12.08, 12.37, 12.50, 12.58, 13.44, 13.92, 14.48, 15.00, 15.10.

In water solution at a temperature of 25° C. the specific rotation of sodium D light by northebaine hydrochloride is $-226°$ when the concentration of the compound is 0.9 percent on a weight-per-volume basis.

Northebaine is obtained as the free base by neutralizing the hydrochloride salt obtained by the demethylation process with aqueous 10 percent sodium carbonate solution and extracting the free base with chloroform. The chloroform solution is dried and evaporated in vacuo, leaving a white solid. Recrystallization of the white solid from a mixture of ethyl acetate and petroleum ether yields northebaine free base as a white crystalline solid melting at about 152–153° C. Northebaine is sufficiently basic that it will form acid addition salts with a wide variety of inorganic acids such as hydrochloric (supra), hydrobromic, sulfuric, phosphoric, and organic acids such as salicylic, tartaric, oxalic, citric, and the like.

Compounds to which this process for demethylation is applicable are represented by the following formula:

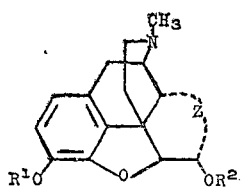

wherein $R^1$ and $R^2$ are hydrogen, methyl, or lower-acyl, and Z is either —CH=CH— or =CH—CH=. Lower-acyl includes $C_1$–$C_5$ acyl, exemplified by acetyl, propionyl, butyryl, α-methylbutyryl, and valeryl. The novel process yields compounds, and the addition salts thereof, having the following formula:

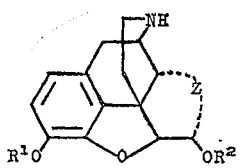

wherein $R^1$, $R^2$ and Z have the same significance as hereinabove.

The compounds thus prepared are useful as intermediates in the synthesis of pharmacologically active compounds. They are also in themselves CNS depressants and possess some autonomic activity. Some of the compounds are remarkably nontoxic.

While the application of the process to thebaine has been discussed above, the monodemethylation of other alkaloids such as morphine and oripavine, and derivatives containing acid-sensitive groups, can be accomplished in the same manner and under the same conditions. Thus, such compounds as 6-lower-acylmorphine and 6-lower-acylcodeine can be readily monodemethylated by this procedure, providing interesting and useful intermediates previously unattainable by any simple, direct method of synthesis.

The process hereby disclosed is more fully illustrated by the following operating examples.

EXAMPLE 1

*Northebaine*

A solution was prepared by dissolving 31.2 g. (0.10 mole) of thebaine and 19.2 g. (0.11 mole) of ethyl azodicarboxylate in 200 ml. of benzene, and the solution was refluxed for about 3 hours on the steam bath. The reaction mixture was cooled and the benzene solvent removed in vacuo, leaving the intermediate compound, N-(1,2-dicarbethoxyhydrazinylmethyl)thebaine, in crude form as a residue.

*Method A.*—To the residue were added 150 ml. of ethanol, 150 ml. of water, and 100 ml. of saturated aqueous ammonium chloride solution. The resulting mixture was refluxed for about 5 hours and allowed to stand overnight at room temperature. The reaction product mixture was worked up by evaporating part of the solvent, mainly the ethanol, in vacuo, leaving a mixture of water and a water-insoluble solid, which solid was filtered off. The solid melted at about 260–270° C. with decomposition. One recrystallization of the solid from water yielded northebaine hydrochloride having a melting point of about 270–272° C. (d.) and weighing about 20 g. (60 percent yield).

*Analysis.*—Calcd: C, 64.76; H, 6.04; N, 4.20; Cl, 10.62. Found: C, 64.88; H, 6.01; N, 4.17; Cl, 10.67.

*Method B.*—A mixture of 9.7 g. (0.02 mole) of N-(1,2-dicarbethoxyhdrazinylmethyl)thebaine, 4.64 g. (0.02 mole) of pyridine hydrochloride, 50 ml. of water, and 100 ml. of ethanol was allowed to react at ambient room temperature overnight, about 17 hours. The reaction product mixture was worked up as above to yield northebaine hydrochloride salt as a solid having a melting point of about 274–275° C. (d.) and weighing about 6.2 g. (93 percent yield).

*Analysis.*—Calcd: N, 4.18. Found: N, 4.11.

Northebaine free base was obtained by suspending 0.80 g. (0.0024 mole) of northebaine hydrochloride in 10 ml. of an aqueous 10 percent sodium carbonate solution and extracting the liberated northebaine base with chloroform. The chloroform extract was dried and concentrated to dryness in vacuo. The solid residue was recrystallized twice from a mixture of ethyl acetate-petroleum ether to yield northebaine as a solid having a melting point of about 152–153° C. and weighing about 0.60 g. (84.4 percent yield).

*Analysis.*—Calcd: C, 72.70; H, 6.44; N, 4.71. Found: C, 73.13; H, 7.28; N, 4.35.

A mixture of equimolecular amounts of northebaine and salicylic acid was dissolved in methanol and refluxed for about 3 hours.

The reaction product mixture was conveniently worked up by adding ethyl acetate to the boiling mixture and evaporating the methanol therefrom, whereby a crystalline product separated, which was filtered off and found to have a melting point of about 194–195° C. It was identified by analysis as 6-northebaine salicylate.

*Analysis.*—Calcd: C, 68.95; H, 5.78; N, 3.22. Found: C, 68.99; H, 6.04; N, 3.13.

EXAMPLE 2

*6-acetylnorcodiene hydrochloride*

A mixture of 6.7 g. (0.0188 mole) of 6-acetylcodiene, 3.83 g. (0.022 mole) of ethyl azodicarboxylate, and 100 ml. of benzene was refluxed for about 3 hours. The reaction product mixture was worked up by concentrating it to dyness in vacuo to yield 11 g. of a brown glassy residue. To this residue were added 40 ml. of a saturated aqueous ammonium chloride solution, 175 ml. of ethanol, and 10 ml. of water, and the mixture was refluxed for about 3 hours. The reaction product mixture was concentrated in vacuo to remove the ethanol. The mixture remaining was acidified with 100 ml. of aqueous 1 N hydrochloric acid, extracted with ether to remove undesired by-products, and the ether extracts discarded. The aqueous layer was made basic with concentrated aqueous ammonium hydroxide, extracted with chloroform, and the water layer discarded. The chloroform layer was concentrated in vacuo to yield a residue weighing 9 g. The residue was dissolved in a mixture of chloroform and ether and the solution saturated in the cold with anhydrous hydrogen chloride gas. The tan, gummy material which separated was filtered off, slurried in a mixture of 75 ml. of ethanol and 10 ml. of methanol, cooled, and filtered, and the filtrate discarded. The insoluble material obtained weighed 5.5 g. wet and melted at about 304–306° C. It was recrystallized from a mixture of methanol, water, and ether to yield 6-acetylnorcodeine hydrochloride having a melting point of about 308–309° C. (d.) and weighing about 2 g. (29.3 percent yield).

*Analysis.*—Calcd: C, 62.71; H, 6.09; Cl, 9.75. Found: C, 62.76; H, 6.29; Cl, 9.86.

The free base, 6-acetylnorcodeine, was conveniently prepared by the procedure used in Example 1 for preparing northebaine free base, and found to have a melting point of about 97–700° C.

*Analysis.*—Calcd: C, 69.70; H, 6.46; N, 4.28. Found: C, 69.42; H, 6.20; N, 4.05.

EXAMPLE 3

6-acetylnormorphine hydrochloride

Following the procedure of Example 2, but using 7 g. (0.01895 mole) of diacetylmorphine and 4.4 g. (0.0253 mole) of ethyl azodicarboxylate, 6-acetylnormorphine was obtained in the form of its hydrochloride salt having a melting point of about 313–315° C. (d.) after recrystallization from a mixture of methanol, ethyl acetate, and ether. Weight, 2.5 g. (43.2 percent yield).

*Analysis.*—Calcd: C, 61.80; H, 5.76. Found: C, 61.14; H, 5.89.

The free base, 6-acetylnormorphine, is conveniently prepared by the procedure used in Example 1 for preparing northebaine free base.

EXAMPLE 4

6-butyrylnorcodeine hydrochloride

Following the procedure of Example 2, but using crude 6-butyrylcodeine (prepared from 6 g. (0.01895 mole) of codeine) and 3.85 g. (0.022 mole) of ethyl azodicarboxylate as the reactants, 6-butyrylnorcodeine was obtained in the form of its hydrochloride salt having a melting point of about 288–289° C. after recrystallization from a mixture of ethanol and ether. Weight, 3.5 g. (47.5 percent yield).

*Analysis.*—Calcd: C, 64.39; H, 6.68; Cl, 9.05. Found: C, 64.18; H, 6.72; Cl, 9.23.

The free base, 6-butyrylnorcodeine, was conveniently prepared by the procedure used in Example 1 for preparing northebaine free base, and found to have a melting point of about 192–195° C.

*Analysis.*—Calcd: C, 70.96; H, 7.09; N, 3.94. Found: C, 71.04; H, 7.11; N, 4.12.

EXAMPLE 5

6-propionylnorcodeine hydrochloride

Following the procedure of Example 2, but using crude 6-propionylcodeine (prepared from 7 g. (0.022 mole) of codeine) and 4.5 g. (0.0259 mole) of ethyl azodicarboxylate as the reactants, 6-propionylnorcodeine was obtained in the form of its hydrochloride salt having a melting point of about 293–295° C. (d.) after recrystallization from a mixture of methanol and ether. Weight, 1.8 g. (21.7 percent yield).

*Analysis.*—Calcd: C, 63.57; H, 6.40; Cl, 9.38. Found: C, 63.58; H, 6.48; Cl, 9.55.

The free base, 6-propionylnorcodeine, is conveniently prepared by the procedure used in Example 1 for preparing northebaine free base.

We claim:

1. In a process for preparing a compound represented by the following formula,

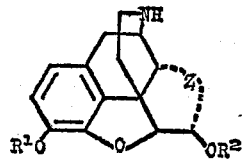

wherein $R^1$ and $R^2$ are selected from the group consisting of hydrogen, methyl, and lower-acyl; and Z is selected from the group consisting of —CH=CH— and =CH—CH=; by comminigling an alkaloid having the following formula,

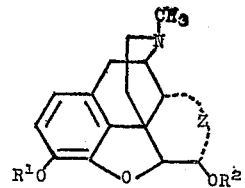

wherein $R^1$, $R^2$, and Z have the same significance as hereinabove, with a lower-alkyl azodicarboxylate in an inert organic mutual solvent, and exposing the resulting mixture to an elevated temperature for a time sufficient to effect reaction thereof, the step which comprises commingling the reaction product mixture with an aqueous solution of a salt selected from the group consisting of ammonium chloride and pyridine hydrochloride, and exposing the resulting mixture to a temperature in the range of about 20 to about 100° C. for a time sufficient to bring about substantial hydrolysis of said reaction mixture, whereby the desired product is produced in the form of the corresponding acid addition salt thereof.

2. The process of claim 1 wherein said salt is ammonium chloride.

3. The process of claim 1 wherein said salt is pyridine hydrochloride.

4. 6-acetylnorcodeine.
5. 6-acetylnorcodeine hydrochloride.
6. 6-butyrylnorcodeine.
7. 6-butyrylnorcodeine hydrochloride.
8. 6-acetylnormorphine.
9. 6-acetylnormorphine hydrochloride.
10. 6-propionylnorcodeine.
11. 6-propionylnorcodeine hydrochloride.
12. The process of claim 2 wherein thebaine is converted into northebaine.
13. The process of claim 3 wherein thebaine is converted into northebaine.

References Cited

UNITED STATES PATENTS 3,299,072    1/1967    Bartels-Keith _____ 260—285

OTHER REFERENCES

Bentley: "The Chemistry of Morphine Alkaloids," Oxford, 1954, pp. 81 and 82.

Chem. Absts. vol. 57, col. 12379(b), (1960), Abstracting, Rausch et al., Acta Physiol, Acad. Sci. Hung. vol. 15, pp. 329–37 (1959).

ALEX MAZEL, *Primary Examiner.*

N. S. RIZZO, *Examiner.*

D. G. DAUS, *Assistant Examiner.*